United States Patent [19]

Shirahata et al.

[11] 4,250,225
[45] Feb. 10, 1981

[54] PROCESS FOR THE PRODUCTION OF A MAGNETIC RECORDING MEDIUM

[75] Inventors: Ryuji Shirahata; Tatsuji Kitamoto; Masaaki Suzuki; Hiroshi Amari, all of Odawara, Japan

[73] Assignee: Fuji Photo Film Co., Ltd., Japan

[21] Appl. No.: 927,037

[22] Filed: Jul. 24, 1978

Related U.S. Application Data

[63] Continuation of Ser. No. 841,323, Oct. 11, 1977, abandoned, which is a continuation of Ser. No. 624,282, Oct. 20, 1975, abandoned.

[30] Foreign Application Priority Data

Oct. 28, 1974 [JP] Japan .................. 49-123468

[51] Int. Cl.$^3$ ............................ H01F 10/00
[52] U.S. Cl. ..................... 428/336; 427/40; 427/128; 427/129; 427/132; 428/220; 428/339; 428/458; 428/461; 428/463; 428/464
[58] Field of Search ................ 427/127-132, 427/48, 39, 40; 428/336, 339, 220, 458, 461, 463, 464, 900

[56] References Cited

U.S. PATENT DOCUMENTS

| | | | |
|---|---|---|---|
| 3,212,918 | 10/1965 | Tsu et ................... | 427/129 X |
| 3,318,721 | 5/1967 | Lineburg ................ | 427/261 |
| 3,457,634 | 7/1969 | Root .................... | 204/4 |
| 3,523,824 | 8/1970 | Bowers et al. ........... | 427/132 X |
| 3,686,018 | 8/1972 | Lindblom et al. ......... | 427/40 |
| 3,745,039 | 7/1973 | Feldstein ............... | 204/385 |
| 3,801,368 | 4/1974 | Fusayama et al. ......... | 427/132 |
| 3,914,521 | 10/1975 | Beatty et al. ........... | 427/40 |
| 3,929,604 | 12/1975 | Shirahata et al. ........ | 427/39 |

*Primary Examiner*—Bernard D. Pianalto
*Attorney, Agent, or Firm*—Wenderoth, Lind & Ponack

[57] ABSTRACT

A magnetic recording medium excellent in adhesiveness and surface property is produced by a process comprising treating the surface of a plastic substrate by glow discharge, then subjecting the substrate to a surface activating treatment and forming a magnetic metallic plating layer on the surface of the substrate by an electroless plating method.

4 Claims, 2 Drawing Figures

PROCESS FOR THE PRODUCTION OF A MAGNETIC RECORDING MEDIUM

This is a continuation application of the Applicants' application Ser. No. 841,323, filed on Oct. 11, 1977 which is a continuation application of Ser. No. 624,282, filed Oct. 20, 1975, not both abandoned.

BACKGROUND OF THE INVENTION

This invention relates to a process for the production of a magnetic recording medium by electroless plating and more particularly, it is concerned with a novel process for the production of a magnetic recording medium excellent in adhesiveness as well as in surface property by electroless plating.

Thin layers of ferromagnetic metals formed by electroplating, electroless plating, sputtering, vacuum vapor deposition or iron plating have lately been noticed as a binder-free, so called non-binder type, magnetic recording medium in place of the magnetic recording media of the prior art in which a powdered magnetic material of $\gamma\text{-Fe}_2\text{O}_3$, Co-doped $\gamma\text{-Fe}_2\text{O}_3$, $\text{Fe}_3\text{O}_4$, $\text{CrO}_2$ or ferromagnetic alloy powders is dispersed in an organic binder and coated. It has been proposed theoretically and experimentally to raise the coercive force as well as to make the thickness thinner as one requirement for magnetic recording media for high density recording and it has been expected that such a non-binder type magnetic recording medium has great possibilities, which can readily be made thinner by a factor of 10 than coated type magnetic recording media and has a very large saturated magnetization.

The electroless plating method has an advantage that a magnetic layer can be formed on, in particular, a non-conductive substrate with a good adhesiveness and a magnetic layer having excellent magnetic properties can uniformly be formed. In this specification, the electroless plating means a chemical reduction plating wherein a metal ion to be plated is reduced with a reducing agent in a plating solution and deposited on a substrate under metallic state. In order to start and accelerate this reduction reaction on the surface of the substrate only, it is necessary to give a catalytic activity to the surface of the substrate by a pretreatment. Where a plastic substrate is subjected to magnetic plating, for example, various steps of defatting-etching-substrate surface activating-electroless magnetic plating have commonly been carried as disclosed in U.S. Pat. Nos. 3,245,826 and 3,353,986. The steps of defatting and etching are carried out so as to form a magnetic plating layer uniformly on a substrate with a good adhesiveness and both steps may be accomplished by one solution. For example, an aqueous solution of sodium hydroxide or mixed solution of sulfuric acid and a bichromate is widely used as a defatting and etching solution. The usual method for the substrate surface activation treatment consists in sensitization using a sensitizer consisting of a hydrochloric-acidic solution of $\text{SnCl}_2$ and subsequent activation using an activator containing a noble metal ion such as Pd, Au or Ag, as described in U.S. Pat. No. 2,702,253. On the surface of the substrate thus treated are bonded fine particles of Pd, Au or Ag capable of acting as a catalyst of plating reaction. The other methods for the substrate surface activation treatment, as described in U.S. Pat. Nos. 3,011,920 and 3,532,516, have also been put to practical use, which consist in a treatment with a Pd-Sn sol (catalyst treatment) and a subsequent treatment with an accelerator.

As an electroless magnetic plating bath to obtain a high saturation magnetization and coercive force, well known are baths containing cobalt ion or cobalt ion plus nickel ion as a magnetic metal ion and hypophosphite ion as a reducing agent (U.S. Pat. Nos. 3,116,159 and 3,219,471). A magnetic recording medium having a magnetic layer formed by electroless plating is suitable for short wavelength recording, in particular, which recording wavelength is approximately 1 $\mu\text{m}$ like a video signal, but the practical problems such as stripping of a magnetic plating layer during friction with a head due to its low adhesiveness, and lack of the reproducing output due to the surface irregularity, cannot completely be solved in the magnetic recording medium obtained by the prior art electroless plating method. In the case of producing a magnetic recording medium by forming a magnetic layer on a plastic substrate by electroless plating as described above, it has been proposed to treat the surface of the plastic substrate with an aqueous solution of caustic soda or mixed solution of dichromate and sulfuric acid so as to improve the adhesiveness of the magnetic plating layer and to effect an even plating. If, however, the extent of this surface treatment is large, the surface property of the magnetic plating layer is deteriorated, although the adhesiveness is improved; while if the extent of this surface treatment is small, the surface smoothness is improved, but the adhesiveness is not increased. Therefore, a magnetic recording medium whose adhesiveness and surface property are simultaneously improved is hardly obtained.

We, the inventors, have made various studies on a process for the production of a magnetic recording medium by electroless plating and consequently found that a magnetic recording medium excellent in adhesiveness as well as in surface property can be produced by subjecting the surface of a plastic substrate to a glow discharge treatment and then to an electroless plating to form a magnetic thin layer.

SUMMARY OF THE INVENTION

It is an object of the invention to provide an improved process for the production of a magnetic recording medium, whereby the above described problems can be solved.

It is another object of the invention to provide an improved process for the production of a magnetic recording medium excellent in adhesiveness and surface smoothness by on electroless plating method.

It is a further object of the invention to provide a novel process for producing a magnetic recording medium utilizing glow discharge.

These objects can be attained by a process for the production of a magnetic recording medium, which comprises treating the surface of a plastic substrate by glow discharge, then subjecting the substrate to a surface activating treatment and forming a magnetic metallic layer on the substrate by electroless plating.

BRIEF DESCRIPTION OF THE DRAWING

The accompanying drawings are to illustrate the principle and merits of the invention in greater detail.

DETAILED DESCRIPTION OF THE INVENTION

Figure 1:
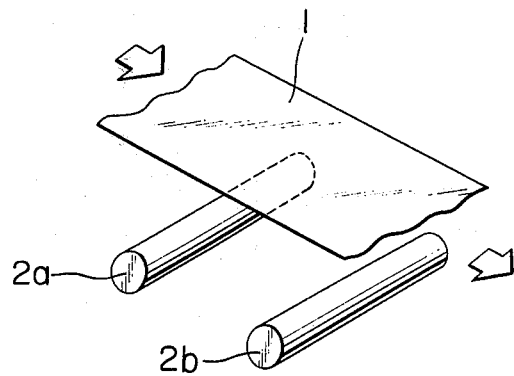
FIG. 1 and FIG. 2 show schematic views of embodiments of the present invention, in which plastic substrate 1 is subjected to a glow discharge treatment between electrodes 2a and 2b.

In accordance with the present invention, a magnetic plating layer with a good adhesiveness as well as an excellent surface property can be formed without any etching treatment of a plastic surface with an aqueous solution of caustic soda or mixed solution of bichromate and sulfuric acid. It has been desired for a long time to obtain a magnetic plating layer excellent in adhesiveness as well as in surface smoothness, which is suitable for a high density magnetic recording medium, without the necessity of the surface roughening treatment of a plastic subtrate as described above. This desire can be actualized by the present invention.

In the case of forming a thin film on a substrate by the vacuum vapor deposition method of the prior art, it has been widely known to clean the surface of the substrate by glow discharge (Cf. L. Holland, *Vacuum Deposition of Thin Film*, Chapman & Hall Ltd., 1956, pages 64 to 66 and 74 to 80). In that case, however, the vacuum vapor deposition is carried out in the same vacuum system as the glow discharge after water, adsorbed gases, organic substrates and oxides are removed by the glow discharge, thereby forming a thin film on the surface of the substrate, and when the substrate is exposed to the atmosphere after the glow discharge treatment in vacuo, the cleaning effect is immediately exhausted. Moreover, it is necessary to effect the cleaning treatment of the surface of a substrate by glow discharge for several ten minutes depending upon the conditions of glow discharge, in particular, at least several minutes. In the present invention, on the contrary, an electroless plating treatment differing in mechanism completely from a vapor deposition treatment is carried out and, even if a plastic substrate is allowed to stand in the air for a long time (for example for one month after glow discharge), a magnetic recording medium having an excellent adhesiveness and surface property can be obtained by the ordinary substrate surface activating treatment and electroless magnetic plating. The plastic surface treatment by glow discharge according to the present invention can be completed in a very short period of time, for example, several seconds to several minutes to obtain a desired effect.

As illustrated above, the present invention is based on a completely novel phenomenon that cannot be anticipated from the prior art cleaning treatment by glow discharge, and the mechanism of the surface treatment by glow discharge according to the present invention is different from that of the prior art. Thus a magnetic recording medium excellent in adhesiveness and surface property is obtained by electroless plating without the necessity of roughening the surface of a plastic substrate, whereby the durability in the relative movement to a magnetic head during magnetic recording is increased and the space loss is decreased because of the improvement of contact with the magnetic head. This is a marked effect of the invention.

The plastic substrate used in the invention has a thickness of 5 to 100 μm, preferably, 10 to 40 μm and is of a material selected from polyesters such as polyethylene terephthalate and polyethylene naphthalate, polyolefins such as polypropylene, cellulose derivatives such as cellulose triacetate, polycarbonates and polyimides.

The conditions of glow discharge, depending upon the varieties of atmospheric gas, apparatus, plastic substrate, etc., are generally a degree of vacuum of 0.01 to 0.5 Torr, voltage of 0.1 to 5.0 KV (AC or DC) and time of 1 second to 5 minutes. Examples of the atmospheric gas are air, oxygen, nitrogen and rare gases such as helium, neon, argon, krypton, xenon and radon.

As the surface activating treatment which can be used in the present invention there are, for example, the method as described in U.S. Pat. No. 2,702,253, which comprises sensitization using a sensitizer consisting of a hydrochloric-acidic solution of $SnCl_2$ and subsequent activation using an activator containing a noble metal ion such as Pd, Au, Ag or Pt, and the treatment method with a catalyst and accelerator, as described in U.S. Pat. No. 3,011,920 and 3,532,518. Preferred compositions of the above described sensitizer and activator are as follows:

Sensitizer $SnCl_2$: 0.16-150 g/l of Water
HCl: 0.8-200 ml/l of Water
(Surfactants can be added.)

Activator

Noble metal ions: 0.0001-0.012 mol/l of Water
HCl: 3-20 ml/l of Water
(Surfactants can be added.)

The above described catalyst and accelerator have preferably the following compositions:

Catalyst $Sn^{+2}$ ion: 0.01-0.98 mol/l of Water
$Sn^{+4}$ ion: 0-0.02 mol/l of Water
Noble metal ions: 0.0001-0.012 mol/l of Water
HCl: 0.5-350 ml/l of Water

Accelerator 5-50% aqueous solutions of perchloric acid, sulfuric acid, phosphoric acid, sodium hydroxide, sodium carbonate, sodium pyrophosphate, ammonium fluoride and hydrofluoric acid or mixed solutions thereof As the electroless plating bath of the invention there can be used, as is well known in the art, those baths containing (1) ferromagnetic metal ions such as cobalt, nickel and iron ions and/or other metal ions to form a ferromagnetic metal thin plating layer, (2) a reducing agent such as hypophosphite, borohydride compound or hydrazine, (3) a complexing agent such as malonic acid, succinic acid, tartaric acid, citric acid or ammonium salts thereof, (4) a pH buffering agent such as formic acid, acetic acid, malonic acid, succinic acid, citric acid or boric acid and (5) a pH regulator such as sodium hydroxide, ammonium hydroxide, sodium carbonate, hydrochloric acid, nitric acid or sulfuric acid. The thickness of an electroless magnetic plating player should be determined considering the necessary conditions for giving a sufficient output as a magnetic recording medium and effecting favourably a high density recording and is generally 0.05 to 1.0 μm, preferably, 0.1 to 0.4 μm. The magnetic plating layer can uniformly be formed on any shape of substrate, for example, tapes, sheets, cards, disks and drums.

In a preferred embodiment of the invention, the electroless plating bath consists of an aqueous solution containing 0.02 to 0.6 mol/l of cobalt ion, 0 to 0.02 mol/l of nickel ion and 0.03 to 0.4 mol/l of hypophosphite ion as a reducing agent.

The above described complexing agent, pH buffer and pH regulator can optionally be incorporated in this aqueous solution. The pH of the above described plating bath is preferably 6.5 to 9.0 in view of the use of hypophosphorous acid as a reducing agent and the temperature of the plating bath is preferably 60° to 95° C. so as to advance the plating rapidly. The plating rate is generally 50 to 5000 Å/min, preferably 200 to 2000 Å/min.

As a compound capable of giving cobalt ion use is made of mono- to tetravalent cobalt compounds, for example, inorganic salts, inorganic acid salts, organic acid salts and complex salts. Examples of these cobalt compounds are cobalt chloride, cobalt sulfate, cobalt nitrate, cobalt bromide, cobalt fluoride, cobalt iodide, cobalt perchlorate, cobalt acetate, cobalt benzoate, hexammine cobalt chloride, hexammine cobalt nitrate, hexammine cobalt sulfate, aquopentammine cobalt chloride, ethylenediamine cobalt chloride, cobalt ammonium sulfate, alum $(KCo(SO_4)_2.12H_2O)$, cesium hexafluorocobaltate, heteropoly acid salt $(3K_2O.CoO.2.9MoO_3.6.5H_2O)$, cobalt aluminate, cobalt arsenide, cobalt L-asparaginate, cobalt borate, cobalt carbide, cobalt carbonyl, cobalt platinochloride, cobalt cyclohexanebutyrate, cobalt 2-ethylhexoate, cobalt fluoborate, cobalt fluosilicate, cobalt formate, cobalt gluconate, cobalt glycine, cobalt hydroxide, cobalt molybdate, cobalt lactate, cobalt laurate, cobalt naphthenate, cobalt nitride, cobalt oleate, cobalt arsenate, cobalt boride, cobalt chromate, cobalt citrate, cobalt cyanide, cobalt ferrocyanide, cobalt hexachlorostannate, cobalt oxalate, cobalt phosphate, cobalt phosphite, cobalt selenate, cobalt selenite, cobalt sulfamate, cobalt thiocyanate, potassium cobalt oxalate, cobalt selenide, cobalt silicate, cobalt fluosilicate, cobalt stannate, cobalt titanate and cobalt tungstate.

Above all, cobalt chloride, sulfate, nitrate, bromide, fluoride, iodide, perchlorate, acetate, benzoate, hexammine chloride, hexammine sulfate, hexammine nitrate, aquopentammine chloride, ethylenediamine chloride and ammonium sulfate are particularly preferable.

As a compound capable of giving nickel ion use is made of mono- to tetravalent nickel compounds, for example, inorganic salts, inorganic acid salts, organic acid salts and complex salts. Examples of these compounds are nickel chloride, nickel sulfate, nickel nitrate, nickel bromide, nickel iodide, nickel perchlorate, nickel hypophosphite, nickel selenate, nickel formate, nickel benzenesulfonate, diaquotetrammine nickel nitrate, hexammine nickel chloride, nickel ammonium sulfate, sodium nickel carbonyl $(Na_2(Ni_4(CO)_9))$, nickel ferricyanide, nickel ferrocyanide, nickel hydroxide, nickel periodate, $NiCl_2(P(C_6H_5)_3)_2$, $NiP(C_3H_6As(CH_3)_2)_3(CN)$, $LiNiO_2$, $K_3(NiF_6)$, $K_2(NiF_6)$, $Ni((CH_3)_2AsC_6H_4AS(CH_3)_2)_2Cl_2)Cl$, heteropoly acid salt $(3BaO.NiO_2.9MoO_3.12H_2O)$, nickel aluminate, nickel chloroaluminate, nickel antimonate, nickel arsenate, nickel arsenide, nickel benzoate, nickel carbonyl bis(diphenylphosphite), nickel borate, nickel bromate, nickel carbide, nickel carbonyl, nickel palladium chloride, nickel platinochloride, nickel citrate, nickel cyclohexanebutyrate, nickel cyclopentamethylenedithiocarbamate, nickel dibutyldithiocarbamate, nickel dimethyldithiocarbamate, nickel ethylenediamine sulfate, nickel lactate, nickel naphthenate, nickel acetate, nickel fluoborate, nickel oxalate, nickel pentamethylenedithiocarbamate, nickel phosphate, nickel phosphite, nickel potassium cyanide, nickel potassium fluoride, nickel potassium sulfate, nickel selenide, nickel fluosilicate, nickel sulfamate, nickel tartarate, nickel telluride, nickel tetramine nitrite, nickel thiocyanate, nickel titanate and nickel tungstate.

Above all, nickel chloride, sulfate, nitrate, bromide, iodide, perchlorate, hypophosphite, selenate, formate, benzenesulfonate, diaquotetramine nitrate, hexamine chloride and ammonium sulfate are particularly preferable.

As a compound capable of giving hypophosphite ion $(PH_2O_2)^-$ hypophosphites are used. Examples of these hypophosphites are ammonium, sodium, magnesium, aluminum, potassium, calcium, manganese, iron, cobalt, nickel, zinc, barium, cerium, lead and uranyl hypophosphites. Above all, ammonium, sodium, magnesium, potassium and calcium hypophosphites are particularly preferable.

Suitable compounds are respectively selected from the above described groups and dissolved in water to prepare an aqueous solution containing cobalt ion, nickel ion and hypophosphite ion.

To the plating bath of the invention, in addition, can at least one ion from the following group can be added Li, B, Mg, Ti, V, Cr, Cu, Zn, Ge, Y, Zr, Nb, Mo, Ru, Rh, Pd, Ag, Cd, Sn, Sb, Te, Cs, W, Re, Pb, Bi, La, Ce, Pr, Nd and Au ions in the range of 0.0001 to 0.02 mol/l, depending upon the intended use.

In accordance with the present invention, a magnetic recording medium excellent in adhesiveness and surface property are suitable for high density recording can be produced by electroless plating. That is to say, the present invention serves to improve greatly the electroless plating process of the prior art as well as to put magnetic recording media by electroless plating to practical use.

The present invention will be further illustrated in greater detail in the following examples and comparative examples. It will be self-evident to those skilled in the art that the ratios, ingredients in the following formulations and the order of operations can be modified within the scope of the present invention. Therefore, the present invention is not to be interpreted as being limited to the following examples.

COMPARATIVE EXAMPLE 1

A polyethylene terephthalate film (referred hereinafter to as "PET film") with a thickness of 25 μm was dipped in an aqueous solution of 5 mols/l of sodium hydroxide warmed at 80° C. for 10 minutes for the purpose of defatting and etching, was washed adequately with water and then subjected to a substrate surface activating treatment with the following treating solutions:

Sensitizer: in 1000 ml $SnCl_2.2H_2O$: 10 g
HCl: 30 ml

Activator: in 1000 ml $PdCl_2$: 0.25 g
HCl: 10 ml

After the film was dipped in the sensitizer for 3 minutes and washed with distilled water and then dipped in the activator for 1 minute and washed with distilled water, it was subjected to electroless magnetic plating using the following plating bath composition and plating condition:

Cobalt Chloride (CoCl$_2$.6H$_2$O): 0.6 mol/l
Sodium Hypophosphite (NaH$_2$PO$_2$.H$_2$O): 0.4 mol/l
Ammonium Chloride (NH$_4$Cl): 0.96 mol/l
Sodium Citrate (Na$_3$C$_6$H$_3$O$_7$.H$_2$O): 0.26 mol/l
Potassium Sodium Tartrate (NaKC$_4$H$_4$O$_6$): 0.53 mol/l
Sodium Citrate (Na$_2$C$_4$H$_4$O$_4$.6H$_2$O): 0.06 mol/l
pH: 8.2
Temperature: 80° C.

The plating was carried out until the thickness of a magnetic plating film became 0.2 μm, thus obtaining a magnetic film having a coercive force of 705 Oe and squareness ratio of 0.62. When the adhesiveness of the magnetic film was examined by a stripping test using an adhesive tape, there was found no stripping of the magnetic plating film. The adhesiveness was very excellent.

EXAMPLE 1

The same PET film with a thickness of 25 μm as that of Comparative Example 1 was subjected to a glow discharge treatment. The glow discharge was carried out by arranging a plastic substrate (PET film) 1 and electrodes 2a and 2b in a vacuum chamber as shown in FIG. 1 and applying a voltage to between electrodes 2a and 2b. The glow discharge can be carried out while transporting a film-shaped plastic substrate by feed and wind-up rolls arranged in a vacuum chamber. Using this apparatus, a glow discharge was generated in an argon atmosphere having a vacuum degree of 0.05 Torr at an AC voltage of 2.5 KV and the surface of PET film was treated thereby for 5 seconds. During the same time, the interval of electrodes 2a and 2b was 10 cm and that of electrodes 2a and 2b and the surface of PET film was 12 cm.

The treated PET film was immediately subjected to a substrate surface activating treatment using the same treating solution as that of Comparative Example 1 and then to an electroless plating treatment using the same plating solution and plating conditions as those of Comparative Example 1, until the film thickness reached 0.2 μm. The magnetic plating film obtained in this way showed a good adhesiveness similar to the adhesiveness of the plating film of Comparative Example 1. When a PET film was allowed to stand in the air for 30 days after the above described glow discharge treatment and then subjected to a surface activation treatment and electroless magnetic plating in an analogous manner to Comparative Example 1, the resulting magnetic film showed also a good adhesiveness similar to that of the magnetic film obtained in Comparative Example 1.

EXAMPLE 2

Using the same apparatus as that of Example 1, a glow discharge was generated by applying a DC voltage of 5.0 KV to the electrodes in an air atmosphere with a degree of vacuum of 0.01 Torr and a PET film with a thickness of 25 μm was surface-treated thereby. Then the film was subjected to a substrate surface activating treatment and electroless magnetic plating in an analogous manner to Comparative Example 1. The adhesiveness of the resulting magnetic plating film, measured by a stripping test using an adhesive tape, was excellent. When a PET film was allowed to stand in the air for 4 weeks after the above described glow discharge treatment and then subjected to a substrate surface activation treatment and electroless magnetic plating in an analogous manner to Comparative Example 1, the resulting magnetic film showed also a good adhesiveness.

The surface reflectivity (relative value) of the magnetic plating films obtained in Comparative Example 1 and Examples 1 and 2 was measured to examine their surface smoothness. The results are as follows:
Comparative Example 1: 2.15
Example 1: 6.15
Example 2: 6.05

As apparent from the above described results, magnetic recording media excellent in adhesiveness as well as in surface property can be produced by electroless plating in Examples 1 and 2.

COMPARATIVE EXAMPLE 2

A polyethylene naphthalate film with a thickness of 16 μm and a width of ½ inch was immersed in an aqueous solution of 5 mols/l of sodium hydroxide warmed at 80° C. for 7 minutes for the purpose of defatting and etching, washed adequately with water and then subjected to a substrate surface activating treatment by immersing for 2.5 minutes in Catalyst 6 F Solution and for 2.5 minutes in Accelerator 19 Solution both of which were manufactured by Shipley Co. (2300 Washington Ste., Newton, Mass.). The substrate film was then subjected to electroless plating using the following plating solution and plating conditions until the film thickness reached 0.15 μm, thus preparing a magnetic tape.

Cobalt Chloride (CoCl$_2$.6H$_2$O): 0.04 mol/l
Sodium Hypophosphite (NaH$_2$PO$_2$.H$_2$O): 0.05 mol/l
Ammonium Chloride (NH$_4$Cl): 0.20 mol/l
Citric Acid (H$_3$C$_6$H$_5$O$_7$.H$_2$O): 0.13 mol/l
Boric Acid (H$_3$BO$_3$): 0.50 mol/l
pH: 7.5
Temperature: 80° C.

The magnetic tape prepared in this way had a coercive force of 520 Oe and squareness ratio of 0.72. When the adhesiveness of this magnetic tape was examined in a home VTR, there was no stripping of the magnetic plating film by the magnetic head.

EXAMPLE 3

Figure 2:
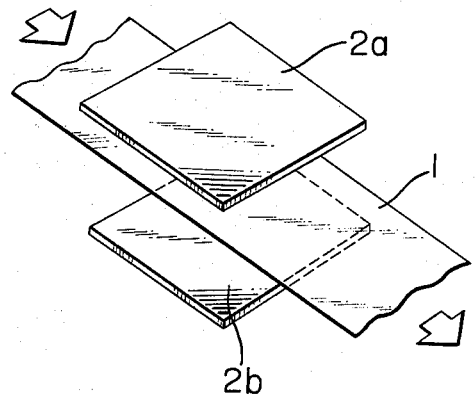

The surface of a polyethylene naphthalate film was subjected to a glow discharge treatment by the method as shown in FIG. 2. Referring to FIG. 2, plastic substrate (polyethylene naphthalate film) 1 was arranged between electrodes 2a and 2b in a vacuum chamber (not shown). The glow discharge can be carried out while transporting a film-shaped plastic substrate by feeding and winding-up rolls arranged in a vacuum chamber. Using this apparatus, a glow discharge was generated in a helium atmosphere having a degree of vacuum of 0.08 Torr at an AC voltage of 1.0 KV and the surface of a polyethylene naphthalate film having a thickness of 16 μm and a width of ½ inch was treated thereby for 3 seconds. During the same time, the interval between the polyethylene naphthalate film and electrode 2a or 2b was adjusted to 10 cm.

The treated polyethylene naphthalate film was immediately subjected to a substrate surface activating treatment using the same treating solution as that of Comparative Example 2 and then to an electroless plating treatment using the same plating solution and plating conditions as those of Comparative Example 2, until the film thickness reached 0.15 μm. When the magnetic tape obtained in this way was travelled in a home, VTR, there was found no stripping of the magnetic plating layer by the magnetic head. When a polyethylene naphthalate film was allowed to stand in the air for 31 days after the above described glow discharge treatment and then subjected to a surface activation treatment and electroless magnetic plating in an analogous manner to Comparative Example 2, the resulting magnetic tape showed also no stripping of the magnetic plating layer by the magnetic head.

EXAMPLE 4

Using the same apparatus as that of Example 3, a glow discharge was generated by applying a DC voltage of 1.5 KV to the electrodes in a nitrogen atmosphere with a degree of vacuum of 0.03 Torr and a polyethylene naphthalate film with a thickness of 16 μm was surface-treated thereby. Then the film was subjected to a substrate activating treatment and electroless magnetic plating in an analogous manner to Comparative Example 2 to thus prepare a magnetic tape. When the adhesiveness of this magnetic tape was examined in a home VTR, there was found no stripping of the magnetic plating film by the magnetic head.

The surface reflectivity and the output of 5 MHz measured by a home VTR of the magnetic tapes obtained in Comparative Example 2 and Example 3 and 4 are tabulated below:

|  | Surface Reflectivity (Relative Value) | Relative Output of 5 MHz (dB) |
|---|---|---|
| Comparative Example 2 | 2.05 | −1.5 |
| Example 3 | 5.95 | 3.2 |
| Example 4 | 5.95 | 3.0 |

It is apparent from these results that the magnetic tape of the present invention is excellent in adhesiveness as well as in surface smoothness and, furthermore, gives a large output at short wavelengths.

COMPARATIVE EXAMPLE 3

The surface of a disk having a radius of 10 cm, made of acrylo-nitrile-butadiene-styrene copolymer resin, was etched with a treating solution having the following composition:
Potassium Bichromate ($K_2Cr_2O_7$): 15 g
Sulfuric Acid ($H_2SO_4$): 100 ml
Water: 50 ml The substrate was adequately washed with water and then subjected to a substrate surface activating treatment by treating with the following sensitizer for 1 minute and with the following activator for 30 seconds.

Sensitizer: in 1000 ml $SnCl_2.2H_2O$: 20 g
HCl: 10 ml
$CH_3(CH_2)_{11}OSO_3Na$: 0.02 g Activator: in 1000 ml $PdCl_2$: 0.5 g
HCl: 5 ml The surface-activated substrate was subjected to magnetic plating using the following plating bath and plating conditions:
Cobalt Sulfate ($CoSO_4.7H_2O$): 0.11 mol/l
Nickel Sulfate ($NiSO_4.7H_2O$): 0.22 mol/l
Sodium Hypophosphite ($NaHPO_2.H_2O$): 0.09 mol/l
Potassium Sodium Tartrate ($NaKC_4H_4O_6$): 0.34 mol/l
Ammonium Sulfate (($NH_4)_2SO_4$): 0.50 mol/l pH: 8.5
Temperature: 75° C.
The magnetic plating film had a thickness of 0.18 μm, coercive force of 635 and squareness ratio of 0.74. This magnetic film showed a good adhesiveness in a stripping test using an adhesive tape.

EXAMPLE 5

A disk substrate of ABS resin having a radius of 10 cm, similar to that of Comparative Example 3, was subjected to a glow discharge treatment as shown in FIG. 1. The glow discharge treatment was carried out in an argon atmosphere with a degree of vacuum of 0.1 Torr at an AC voltage of 0.2 KV for 2.5 minutes. A magnetic plating film was formed on the disk using the same substrate surface activating solution and plating solution as those of Comparative Example 3. When the adhesiveness of the magnetic layer was examined in a stripping test using an adhesive tape, there was found no stripping of the magnetic plating layer. The adhesiveness was good.

Observation of the surfaces of the magnetic plated disks obtained in Comparative Example 3 and Example 5 by means of an electron microscope of scanning type showed that the disk of Comparative Example 3 had a greatly rough surface, while the surface of the disk of Example 5 was smooth.

It will clearly be understood from the foregoing examples that a magnetic recording medium excellent in adhesiveness and surface property and suitable for high density recording can be produced by subjecting a plastic substrate to a glow discharge treatment, ordinary substrate surface activating treatment and electroless magnetic plating in this order.

What is claimed is:

1. A process for the production of a magnetic recording medium, said process comprising:
   treating the surface of a plastic substrate by glow discharge at a voltage of 0.1 to 5.0 KV in an inert atmosphere with a degree of vacuum of 0.01 to 0.5 Torr;
   said plastic substrate being selected from the group of materials consisting of polyethylene terephthalate, polyethylene naphthalate, polypropylene, cellulose triacetate, polycarbonate, polyvinyl chloride and polyimide;
   subjecting said plastic substrate treated by glow discharge to a liquid phase surface activating treatment using materials consisting of:
   (a) a sensitizer consisting of a hydrochloric acid solution of stannous chloride and an activator containing a noble metal ion, or
   (b) a catalyst consisting of a hydrochloric acid solution containing stannous ion, stannic ion and a noble metal ion, an accelerator; and
   forming a magnetic metallic layer having a thickness of 0.05–1.0μ on the substrate in an electroless plating bath using an aqueous solution containing 0.2 to 0.6 mol/l of cobalt ion, 0 to 0.02 mol/l of nickel ion and 0.03 to 0.4 mol/l of hypophosphite ion as a reducing agent, the pH of said plating bath being in the range of 6.5–9.0, the temperature of said bath being in the range of 60°–90° C., and the plating rate being 50–5000 Å/min.

2. A magnetic recording medium produced by the process as claimed in claim 1.

3. The process as claimed in claim 1, wherein the substrate has a thickness of 5 to 100 μm.

4. The process as claimed in claim 1, wherein said inert atmosphere is selected from the group consisting of air, nitrogen, oxygen, helium, neon, argon, krypton, xenon and radon.

* * * * *